(12) United States Patent  (10) Patent No.: US 8,081,527 B1
Venkataraman et al.  (45) Date of Patent: Dec. 20, 2011

(54) PER-BIT DE-SKEW MECHANISM FOR A MEMORY INTERFACE CONTROLLER

(75) Inventors: Srinivas Venkataraman, Santa Clara, CA (US); Praveen Garapally, Fremont, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 368 days.

(21) Appl. No.: 12/437,740

(22) Filed: May 8, 2009

(51) Int. Cl.
*G11C 7/00* (2006.01)

(52) U.S. Cl. . 365/194; 365/154; 365/156; 365/189.011; 365/189.14; 365/189.05; 365/189.08; 365/193; 365/230.06; 365/233.1; 365/233.13; 365/233.17; 711/105; 711/106; 711/104; 711/E12.001

(58) Field of Classification Search .......... 365/154, 365/156, 189.011, 189.14, 189.05, 189.08, 365/193, 194, 230.06, 233.1, 233.13, 233.17, 365/239, 240, 189.12; 711/105, 166, 104, 711/E12.001
See application file for complete search history.

(56) References Cited

U.S. PATENT DOCUMENTS

| 2009/0109770 A1* | 4/2009 | Sugishita | 365/193 |
| 2009/0244997 A1* | 10/2009 | Searles et al. | 365/194 |
| 2010/0157700 A1* | 6/2010 | Kong et al. | 365/194 |

\* cited by examiner

*Primary Examiner* — Fernando Hidalgo
(74) *Attorney, Agent, or Firm* — Harrity & Harrity, LLP

(57) ABSTRACT

A memory controller may implement variable delay elements, on a per-bit basis, in both the read and write paths. The memory controller may include multiple adjustable delay circuits associated with data lines and a strobe line, each of the adjustable delay circuits inserting an adjustable amount of delay into a signal destined to or received from one of the data lines or the strobe line. The memory controller may additionally include control logic to determine the delay amount for each of the adjustable delay circuits, the delay amount being determined to reduce static skew between each of the data lines and the strobe line.

26 Claims, 12 Drawing Sheets

PER-BIT DE-SKEW MECHANISM FOR A MEMORY INTERFACE CONTROLLER

BACKGROUND

Random access memory (RAM) is a type of storage for computing devices. RAM is typically associated with volatile memory that is implemented in integrated circuits and in which stored information is lost when power provided to the RAM is switched off.

One type of RAM is known as DDR SDRAM (double-data-rate synchronous dynamic random access memory). DDR SDRAM is typically used in computing applications that require high bandwidth and low la.tency memory access. One version of this memory technology is known as DDR3 SDRAM, which can provide for high performance data rates, high bandwidth, high density, and low power consumption relative to earlier generations of SDRAM.

The high bandwidth and high operating frequencies required to drive DDR SDRAM can be problematic as they can make the controller to memory interface electrically complex due to signal integrity considerations. A DDR3 SDRAM controller and associated memory may perform read and write operations synchronously based on a periodic signal transmitted over a "strobe" line. Static and dynamic timing variations between the strobe line and a data line can cause memory errors. Static variations that cause timing skew between the strobe and data lines may be due to, for example, on-die process and wire variations across strobe and data logic, on-chip power supply grid variations, package and board interconnect, and material variations. Dynamic timing variations may be caused by short or long term voltage drift and temperature changes during functional operation of the interface.

Existing techniques to compensate for timing skew in memory circuits are frequently based on delay locked loops (DLLs). A DLL is a circuit that can be used to change the phase of a periodic signal to reduce skew between the strobe and data lines in a RAM. More particularly, in a DDR SDRAM, DLLs are used to generate a quarter cycle offset for source synchronous clocks or strobe lines that are used for latching data in read and write cycles. DLL methods, however, tend to not de-skew potentially large static variations that may occur on individual bits or bytes of the DDR SDRAM lines.

SUMMARY

One aspect, as described herein, is directed to a device that may include a random access memory device configured to store data and a memory controller. The memory controller may be connected to the memory device via a plurality of data lines and a strobe line. The memory controller may include control logic and adjustable delay circuits each associated with one of the data lines and the strobe line, each of the adjustable delay circuits inserting an adjustable amount of delay into a signal destined to or received from the one of the data lines or the strobe line. The control logic may determine the delay amount for each of the adjustable delay circuits, the delay amount being determined to reduce timing skew between the data lines and the strobe line.

Another aspect may be directed to a method for initializing a memory controller. The method may include determining first delay periods to apply to data lines connected to a memory device when reading data from the memory device, where the first delay periods are determined separately for each of the data lines. The method may further include determining second delay periods to apply to the data lines connected to the memory device when writing data to the memory device, where the second delay periods are determined separately for each of the data lines. Further, the method may include configuring the memory controller to apply the determined first or second delay periods when reading or writing to or with the memory device.

Yet another aspect may be directed to a memory controller that includes first signal pads for connecting to a plurality of data lines that connect to a memory device and a second signal pad for connecting to a strobe line that connects to the memory device. The memory controller may further include a write delay circuit connected to each of the first signal pads, each of the write delay circuits including serially connected delay elements, where a tap associated with one of the delay elements is selected to provide a corresponding delay to an output of the write delay circuit. The memory controller may further include a read delay circuit connected to each of the first signal pads, each of the read delay circuits including serially connected delay elements, where a tap associated with one of the delay elements is selected to provide a corresponding delay to an input of the read delay circuit.

BRIEF DESCRIPTION OF THE DRAWINGS

The accompanying drawings, which are incorporated in and constitute a part of this specification, illustrate one or more embodiments described here and, together with the description, explain these embodiments. In the drawings.

DETAILED DESCRIPTION

The following detailed description of the invention refers to the accompanying drawings. The same reference numbers in different drawings may identify the same or similar elements. Also, the following detailed description does not limit the invention.

As described herein, a memory controller may implement variable delay elements, on a per-bit basis, in both read and write paths in a DDR SDRAM. The variable delay elements may be adjusted according to training that is performed, for example, at the initialization of a device that uses the memory controller. The memory controller may advantageously de-skew potentially large static variations on each data bit and the corresponding strobe line within a read/write byte.

Exemplary System Overview

Figure 1:
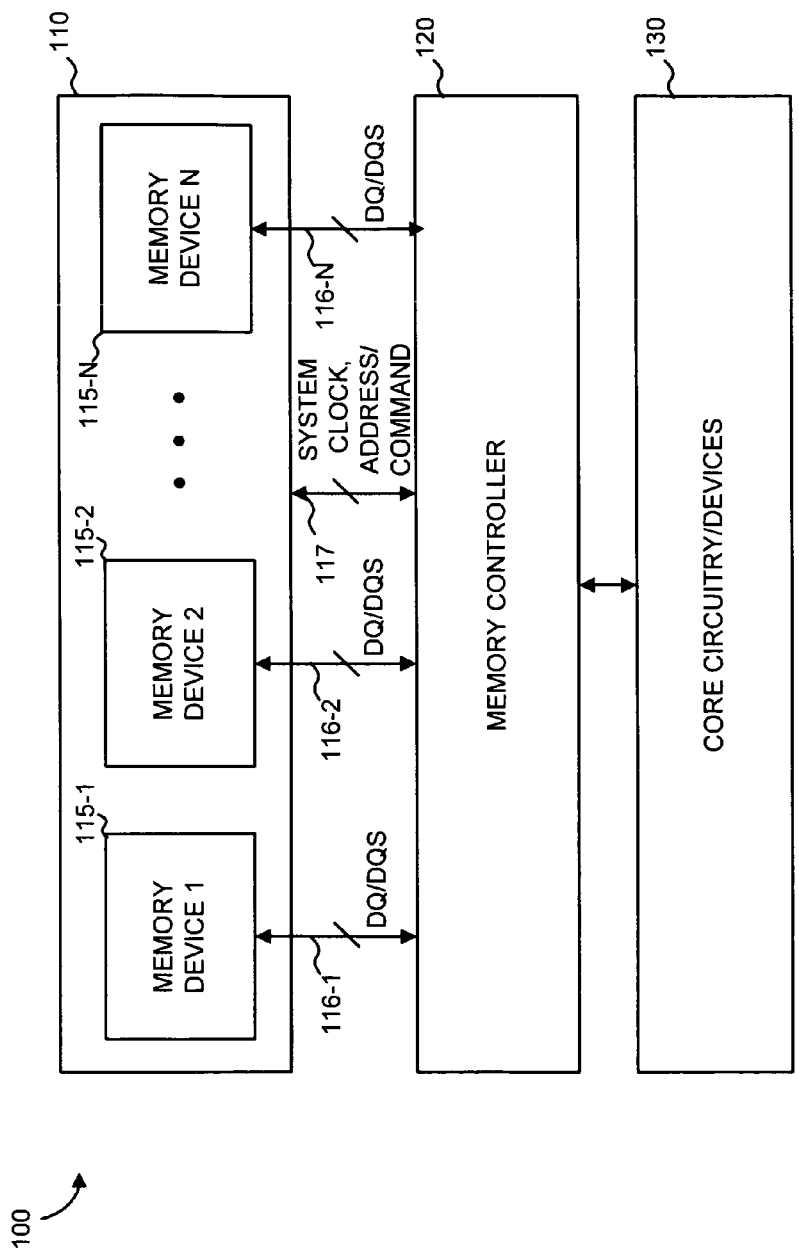
FIG. 1 is a diagram of an exemplary computing system in which concepts described herein may be implemented.

FIG. 1 is a diagram of an exemplary computing system 100 in which concepts described herein may be implemented. Computing system 100 may include a computing device that incorporates random access memory, such as DDR3 SDRAM. For instance, computing system 100 may include an ASIC (application specific integrated circuit), a FPGA (field-programmable gate array), or a circuit board that is designed to perform various functions. For example, computing system 100 may embody or be a part of a network device, such as a router, a switch, a gateway, etc. Computing system 100 may include one or more components or devices that need access to a fast random access memory.

As shown in FIG. 1, computing system 100 may include a memory module 110, a memory controller 120, and core circuitry/devices 130. Memory module 110 may include memory devices 115-1 through 115-N (collectively, memory devices 115). Memory devices 115 may each include, for instance, a memory such as a DDR3 SDRAM memory. In some implementations, memory module 110 may be implemented using one or more stand-alone memory devices 115. In other words, memory devices 115 may be directly connected to memory controller 120 and there may not be any physical "module" that includes the memory devices 115.

Memory controller 120 may read and write data with memory devices 115 of memory module 110. Memory controller 120 may present a single interface through which core circuitry/devices 130 can interact to store and retrieve data. Memory controller 120 may logically present the multiple memory devices 115 to core circuitry/devices 130 as a single storage space that has a capacity equal to the sum of the memory capacities of each of memory devices 115.

Memory controller 120 may read and write data to or from memory module 110 using a number of data (DQ) and strobe (DQS) lines connected to each memory device 115. DQ/DQS sets 116-1 through 116-N are particularly shown in FIG. 1. Each DQ/DQS set 116 may include, for example, eight data (DQ) lines and a corresponding strobe (DQS) line. Data may be read and received with the corresponding memory device 115 in which data bits are synchronously transmitted based on the state of the DQS line. For DDR memory, for instance, data is typically "double pumped" by latching the data on the rising and falling edges of the strobe signal. Memory controller 120 may also connect to memory module 110 using additional control and clock lines, labeled as system clock, address/command lines 117 in FIG. 1.

Core circuitry/devices 130 may include specialized circuits, general purpose processors or microprocessors, or other computing devices that connect to memory controller 120. Through memory controller 120, core circuitry/devices 130 may access memory module 110.

Figure 2:
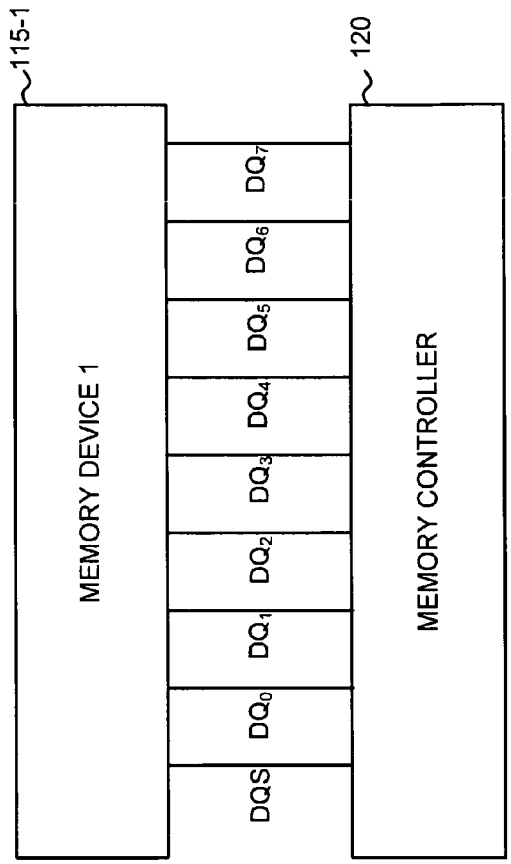
FIG. 2 is a diagram illustrating an exemplary implementation of the memory device and memory controller shown in FIG. 1.

FIG. 2 is a diagram illustrating an exemplary implementation of memory device 115-1 and memory controller 120. In this example, eight DQ lines $DQ_0$ through $DQ_7$ connect memory device 115-1 and memory controller 120. DQ lines $DQ_0$ through $DQ_7$ may each correspond to lines used to transmit or receive data bits. As shown, memory device 115-1 may transmit a single byte (eight bits) simultaneously. Timing for each of lines $DQ_0$ through $DQ_7$ may be synchronized via the DQS line (i.e., the strobe signal). Memory devices 115-2 through 115-N may be similarly connected to memory controller 120.

Figure 3:
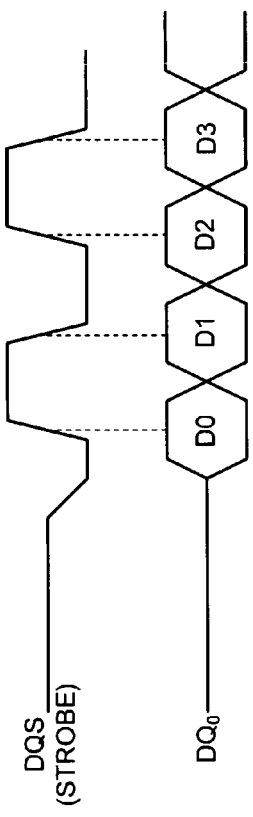
FIG. 3 is an exemplary timing diagram illustrating exemplary interaction between signals shown in FIG. 2.

FIG. 3 is an exemplary timing diagram illustrating exemplary interaction between the DQ and DQS lines shown in FIG. 2. A single DQ line, $DQ_0$, is shown in FIG. 2. Bits D0, D1, D2, and D3 are shown, at different times, on $DQ_0$. Each successive bit may be sampled on $DQ_0$ on both the rising and falling edges of the strobe.

Bit De-Skew

Memory controller 120 and memory module 110 may communicate using a relatively high frequency strobe signal. As previously mentioned, high frequency synchronous memory reads/writes can suffer timing variation skew between the DQS line and the data lines. In particular, static skew between the DQS line and the DQ lines may cause memory read/write errors.

Consistent with aspects described herein, memory controller 120 may include programmable delay elements implemented on a per-bit basis. The programmable delay elements can be used to compensate for skew between the DQS lines and each of the DQ lines.

Figure 4:
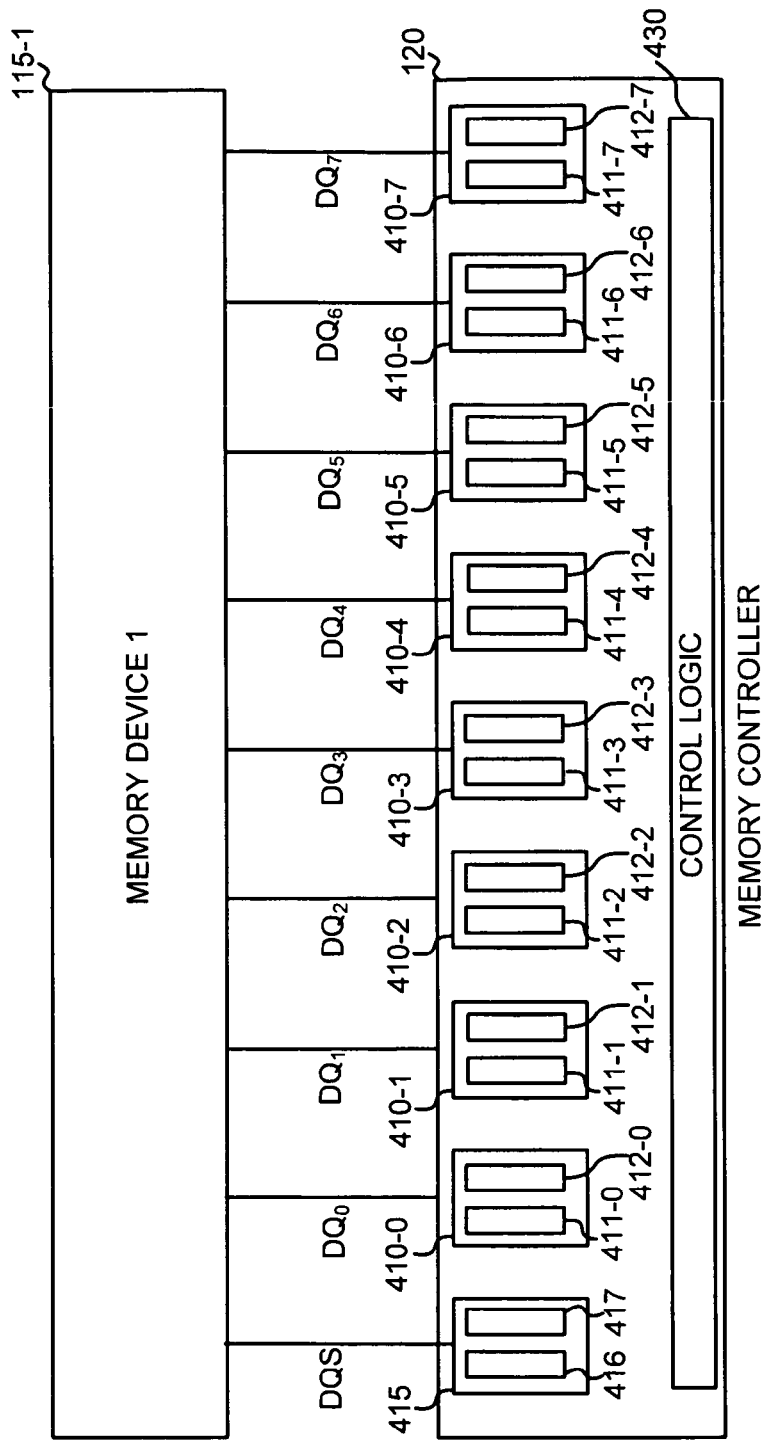
FIG. 4 is a diagram illustrating exemplary components in the memory controller and the memory device shown in FIG. 1.

FIG. 4 is a diagram illustrating exemplary components in memory controller 120 and memory device 115-1. Memory controller 120 may include, for each DQ line, $DQ_0$ through $DQ_7$, a delay circuit 410-0 through 410-7 (collectively, delay circuits 410). Memory controller 120 may also include a delay circuit 415 for the DQS line. Although bits being read or written by memory controller 120 may be transmitted over the same DQ line between memory controller 120 and memory device 115-1, internally to memory controller 120, the read and write bits may be processed on separate read and write paths. Each delay circuit 410 may include a corresponding read delay sub-circuit 411 and a write delay sub-circuit 412. As shown, read delay sub-circuits 411 are labeled in FIG. 4 as read delay sub-circuits 411-0 through 411-7 and write delay sub-circuits 412 are labeled as write delay sub-circuits 412-0 through 412-7. DQS delay circuit 415 may also include a read delay sub-circuit 416 and a write delay sub-circuit 417.

Memory controller 120 may additionally include control logic 430. Control logic 430 may include hardware or combinations of software and hardware for implementing logic that defines memory controller 120. Control logic 430 may particularly act to train and program the delay circuits 410 and 415.

Figure 5:
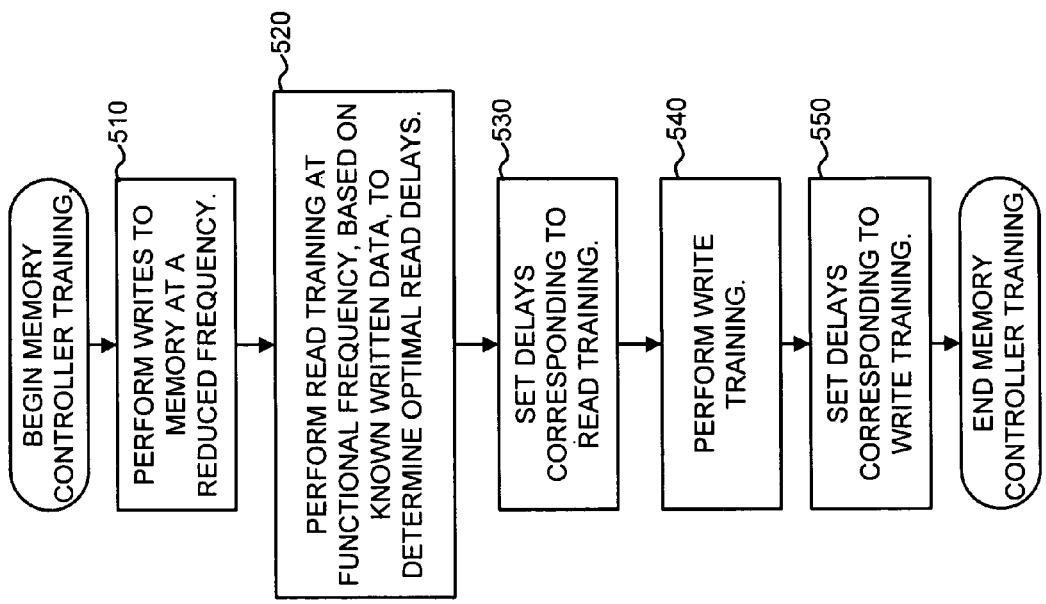
FIG. 5 is a flow chart illustrating exemplary operations for de-skewing DQ and DQS lines shown in FIG. 4.

FIG. 5 is a flow chart illustrating exemplary operations for de-skewing the DQ and DQS lines. The operations shown in FIG. 5 may be performed, for example, when computing system 100 is initially powered-up or reset. In other implementations, the operations for de-skewing the DQ and DQS lines may be performed at other times, such as at the request of an administrator or at other scheduled times. The operations in FIG. 5 will be discussed with reference to memory device 115-1 and memory controller 120. Similar operations can be applied to other memory devices 115-2 through 115-N.

Memory controller 120 may initially write data to memory device 115-1 at a reduced write frequency (block 510). The data written to memory device 115-1 may be data that will be later read out of memory device 115-1 for read training In order to ensure that the data stored in memory device 115-1 is known, even before the de-skew training, the data written to memory device 115-1 may be written at a reduced frequency, such as half the desired run-time frequency. Other fractions of the run-time frequency could, in alternative implementations, be used instead.

Memory controller 120 may next perform read training to reduce skew on the DQ and DQS lines. The read training may be performed on the previously known written data to determine optimal read delays to implement in read delay sub-circuits 411 and DQS read delay sub-circuit 416 (block 520) The read training may be performed at the functional (full frequency) data rate of the memory (block 520). Read training will be discussed in more detail with reference to FIGS. 6-9.

Figure 6:
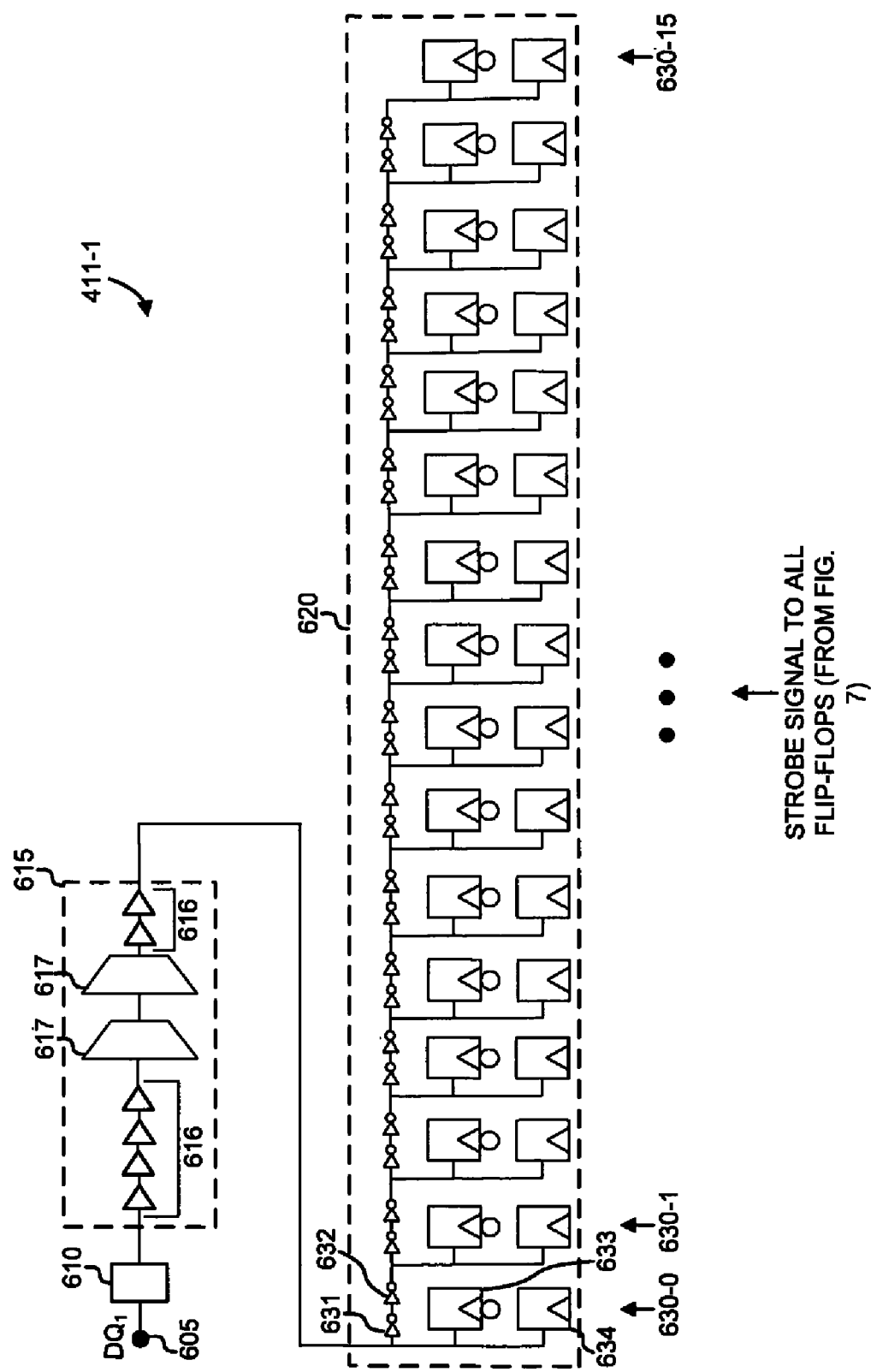
FIG. 6 is a diagram illustrating an exemplary circuit corresponding to a read delay sub-circuit.

FIG. 6 is a diagram illustrating an exemplary circuit corresponding to a read delay sub-circuit, such as read delay sub-circuit 411-1. Each of read delay sub-circuits 411 may be implemented as a circuit similar to the circuit shown in FIG. 6.

Read delay sub-circuit 411-1 may connect to a $DQ_1$ via pad 605. The incoming data signal may then progress through an input/output (I/O) buffer 610, padding buffers 615, and a tap delay chain 620. I/O buffer 610 may include circuitry to initially receive and buffer the incoming signal received at pad 605. The buffered signal may then pass through padding buffers 615. Padding buffers 615 may include one or more delay elements that serve to provide a fixed initial delay to the incoming signal. The initial delay may be, for example, approximately equal to a quarter cycle offset. As particularly shown in the example of FIG. 6, padding buffers 615 may include a number of delay inverters 616 and two multiplexers 617. Delay inverters 616 may provide a relatively small delay, such as on the order of 18-40 picoseconds per buffer. Multiplexers 617 may be configured as simple pass-through multiplexers, which in this implementation, do not actually perform a multiplexing function. Multiplexers 617 may be included primarily to balance the delay associated with similarly constructed multiplexers implemented for the DQS signal line (described below with reference to FIG. 7).

Tap delay chain 620 may function to provide a number of stages of potential delay that may be added to the incoming DQ signal. As particularly shown in the example of FIG. 6, tap delay chain 620 may include 16 stages, labeled as stages 630-0 through 630-15. Each stage, such as stage 630-0, may be associated with two delay inverters 631 and 632, and two buffers 633 and 634. Each delay inverter may introduce a relatively small delay, such as 18-40 picoseconds, into the signal. Buffers 633 and 634 may act as latches in which one flip-flop is triggered on a rising clock signal (e.g., flip-flop 634) and the other is triggered on a falling clock signal (e.g., flip-flop 633). In this manner, each set of flip-flops, such as flip-flops 633 and 634, may sample its input signal twice for each period of its input strobe signal. The input strobe signal may be the DQS signal, which may be provided to all of the flip-flops in stages 630-0 through 630-15.

Each stage of tap delay chain 620 may sample a slightly more delayed version of the received signal $DQ_0$. In other words, the delay chain of inverters may be "tapped" at 16 different delayed versions of the received signal. For example, stage 630-0 may be the first stage in the chain and may output sampled data bits corresponding to the least delayed version of $DQ_0$. Stage 630-15 may be the final stage in the chain and may output sampled data bits corresponding to the most delayed version of $DQ_0$. In this manner, during read-training, each read data bit may be associated with 16 sampled versions of the input data signal line.

Figure 7:
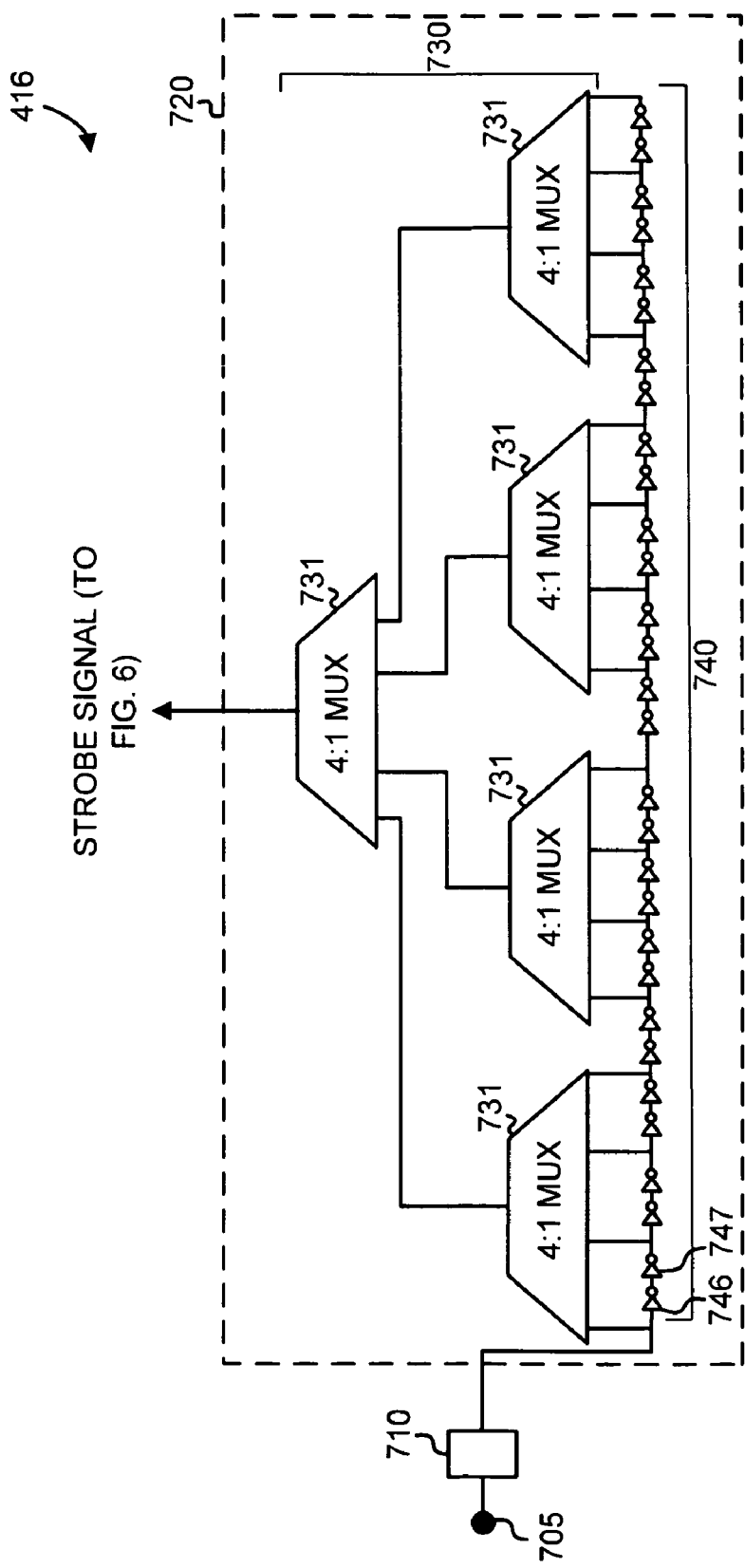
FIG. 7 is a diagram illustrating an exemplary circuit corresponding to a DQS read delay sub-circuit.

FIG. 7 is a diagram illustrating an exemplary circuit corresponding to DQS read delay sub-circuit 416. DQS read delay sub-circuit 416 may generate the input strobe signal that is input to each of the flip-flops in stages 630-0 through 630-15 of FIG. 6.

DQS read delay sub-circuit 416 may connect to a DQS line via pad 705. The incoming signal may then progress through an I/O buffer 710 and into a selectable delay section 720. Selectable delay section 720 may include a multiplexing section 730 and a tap delay chain 740. Multiplexing section 730 may implement a 16:1 multiplexer that selects a signal from one of the delay taps in tap delay chain 740. In the particular implementation illustrated, multiplexing section 730 may include four 4:1 multiplexers 731 that effectively act as a 16:1 multiplexer.

Selectable delay section 740 may provide a number of stages of potential delay that may be added to the incoming strobe signal. As particularly shown in the example of FIG. 7, selectable delay section 740 may include 16 delay stages. At each delay stage, a tap to an input of one of multiplexers 731 may be implemented. Each delay stage may be associated with two inverters, such as inverters 746 and 747. Each delay inverter may introduce a relatively small delay, such as 18-40 picoseconds, into the signal. As the strobe signal travels through selectable delay section 740, the signal may experience an increasingly larger total delay.

Figure 8:
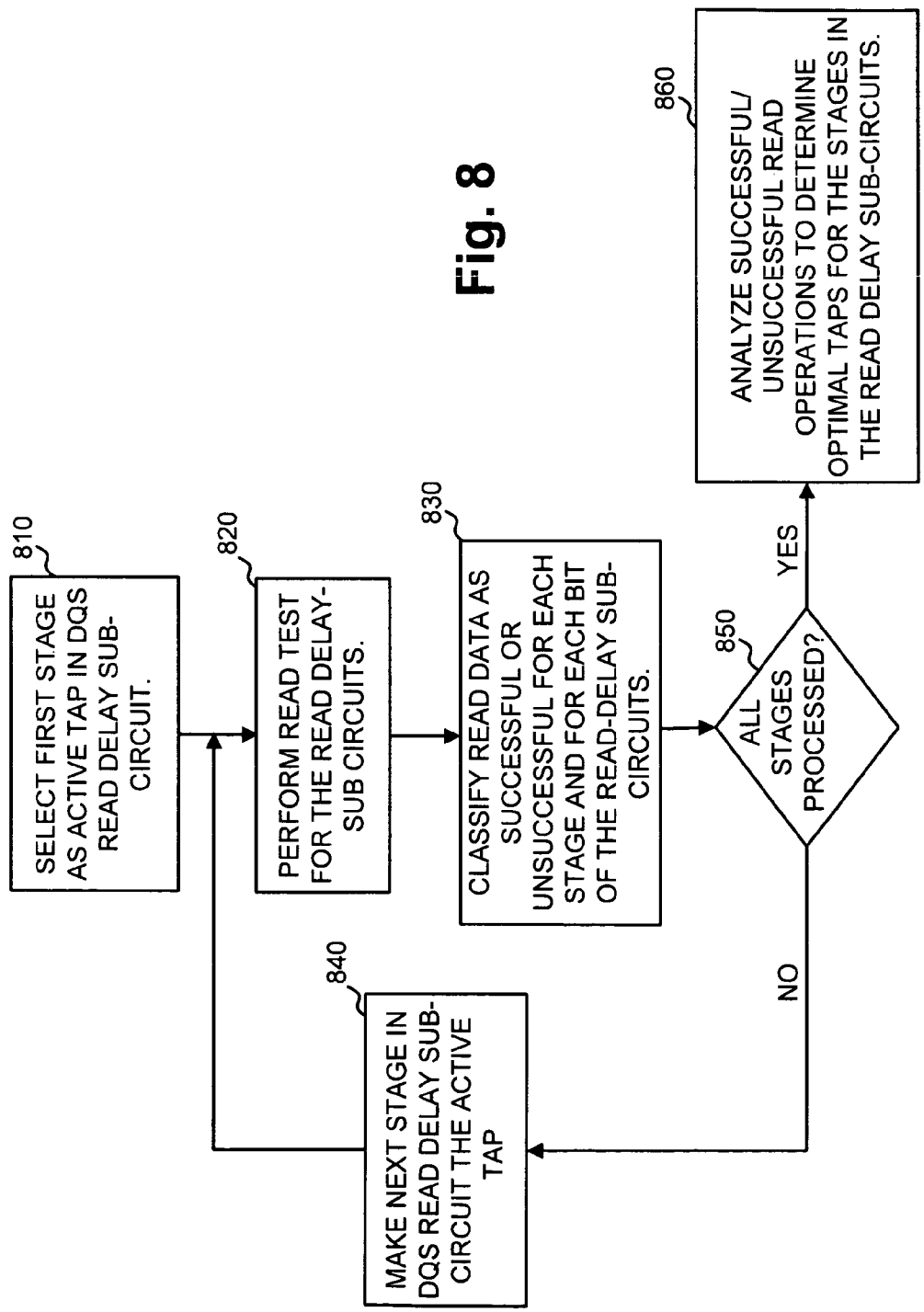
FIG. 8 is a flow chart illustrating exemplary operations for performing read training.

Read training, as performed in block 520, may generally include determining an optimal delay stage 630-0 through 630-15 for each DQ line and an optimal tap point in delay section 740 for the strobe. FIG. 8 is a flow chart illustrating exemplary operations for performing read training.

Control logic 430 of memory controller 120 may select the first stage, as the active tap in DQS read delay sub-circuit 416 (block 810). A read test may next be performed for all the read delay sub-circuits 411 (block 820). In other words, a read may be performed based on the active tap in DQS read delay sub-circuit 416. For each read delay sub-circuit 411, a pair of bits corresponding to each stage (e.g., stages 630-0 through 630-15 for read delay sub-circuit 411-1) may be collected. Pairs of bits that are correct may be classified as a successful read for that delay stage (block 830). Pairs of bits that are not correct (i.e., that do not equal the known previously written data) may be classified as an unsuccessful read for that delay stage (block 830). In some implementations, multiple read operations may be performed and a delay stage in a read delay sub-circuit 411 classified as successful when all of the pairs from the multiple read operations are correct, and unsuccessful otherwise.

Blocks 820 and 830 may be repeated for each tap in selectable delay section 740 (FIG. 7) of DQS read delay sub-circuit 416. In other words, control logic 430 may set the next stage in DQS read delay sub-circuit 416 as the active tap (block 840) until all the stages have been processed (block 850—YES). At this point, control logic 430 may analyze the successful/unsuccessful read operations to determine optimal taps for the stages in DQS read delay sub-circuit 416 and each of read delay sub-circuits 411 (block 860).

Figure 9:
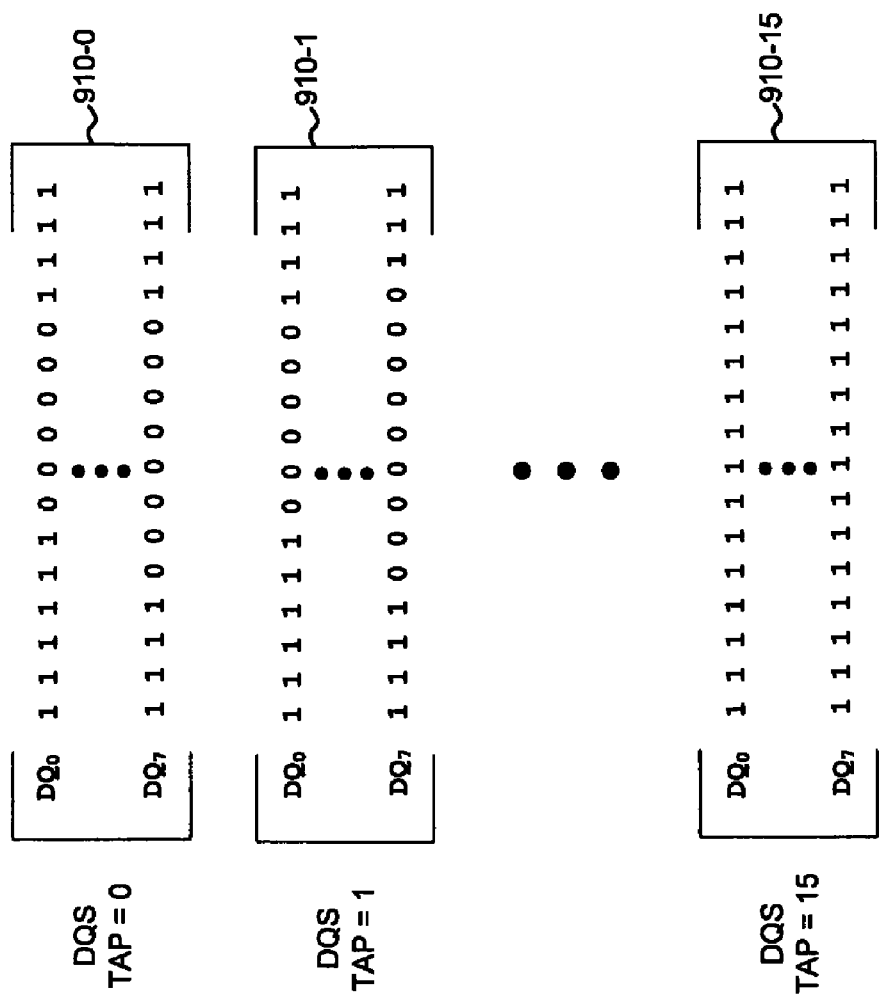
FIG. 9 is a diagram illustrating an exemplary technique for determining an optimal tap in the DQS read delay sub-circuit shown in FIG. 7, based on a valid range of working DQ taps.

FIG. 9 is a diagram illustrating an exemplary technique for determining an optimal tap in DQS read delay sub-circuit 416 and each of read delay sub-circuits 411, as performed in block 860. Matrices 910-0 through 910-15 are illustrated in FIG. 9, where each matrix 910 may include the read test results for all the read delay sub-circuits 411 for a particular value of the tap stage selected in DQS read delay sub-circuit 416. For example, matrix 910-0 may correspond to the tap for stage zero in DQS read delay sub-circuit 416. Each row in matrix 910-0 may correspond to the results for a single read delay sub-circuit 411-0 though 411-7 (i.e., the results for a single DQ line). In this example, assume a successful read result is represented as a "0" and an unsuccessful read result is represented as a "1". For example, for read delay sub-circuit 411-0 ($DQ_0$) in matrix 910-0, the first six stages resulted in a read failure, the next six stages resulted in a read success, and the last four stages resulted in a read failure.

In one implementation, control logic 430 may select the tap in DQS read delay sub-circuit 416 as the tap corresponding to the one of matrix 910 that has the largest number of total successes (i.e., 0s) and in which each read delay sub-circuit 411-0 through 411-7 (i.e., each row in a matrix) has a certain minimum number of successes. For each row in the selected matrix, control logic 430 may then select a tap for the corresponding read delay sub-circuit 411 as one of the successes in the row. Control logic 430 may select the tap corresponding to a stage that is in the middle of a number of sequential successes.

Returning to FIG. 5, control logic 430 may set the determined taps as the active read tap stages for memory controller 120 (block 530). Subsequent read operations performed by memory controller 120 may be performed using the set tap stages. In other words, the incoming DQS strobe may propagate through the delay elements in selectable delay section 740 until it reaches the set tap (where it is selected by multiplexing section 730) and each incoming data signal on the DQ lines may propagate through delay stages 630 until being sampled at the selected stage. Different read delay sub-circuits 411 may be set at different tap points (i.e., to use a different number of delay stages 630). For example, signals passing through read delay sub-circuit 411-0 may be read from delay stage 630-1 while signals passing through read delay sub-circuit 411-5 may be read from delay stage 630-4. In this manner, the read data bits may be adjusted (de-skewed) on a per-bit basis. The de-skewing can correct on-chip static variations and package-board interconnect static variations relative to the strobe line. Both the data delay chains (410) and strobe delay chains (415) can be sized to reduce quantization error and to provide adequate delay range to allow for operation at higher and lower frequencies from the target interface operating frequency.

As further shown in FIG. 5, write training may be performed for memory controller 120 (block 540). Write training will be discussed in more detail with reference to FIGS. 10 and 11.

Figure 10:
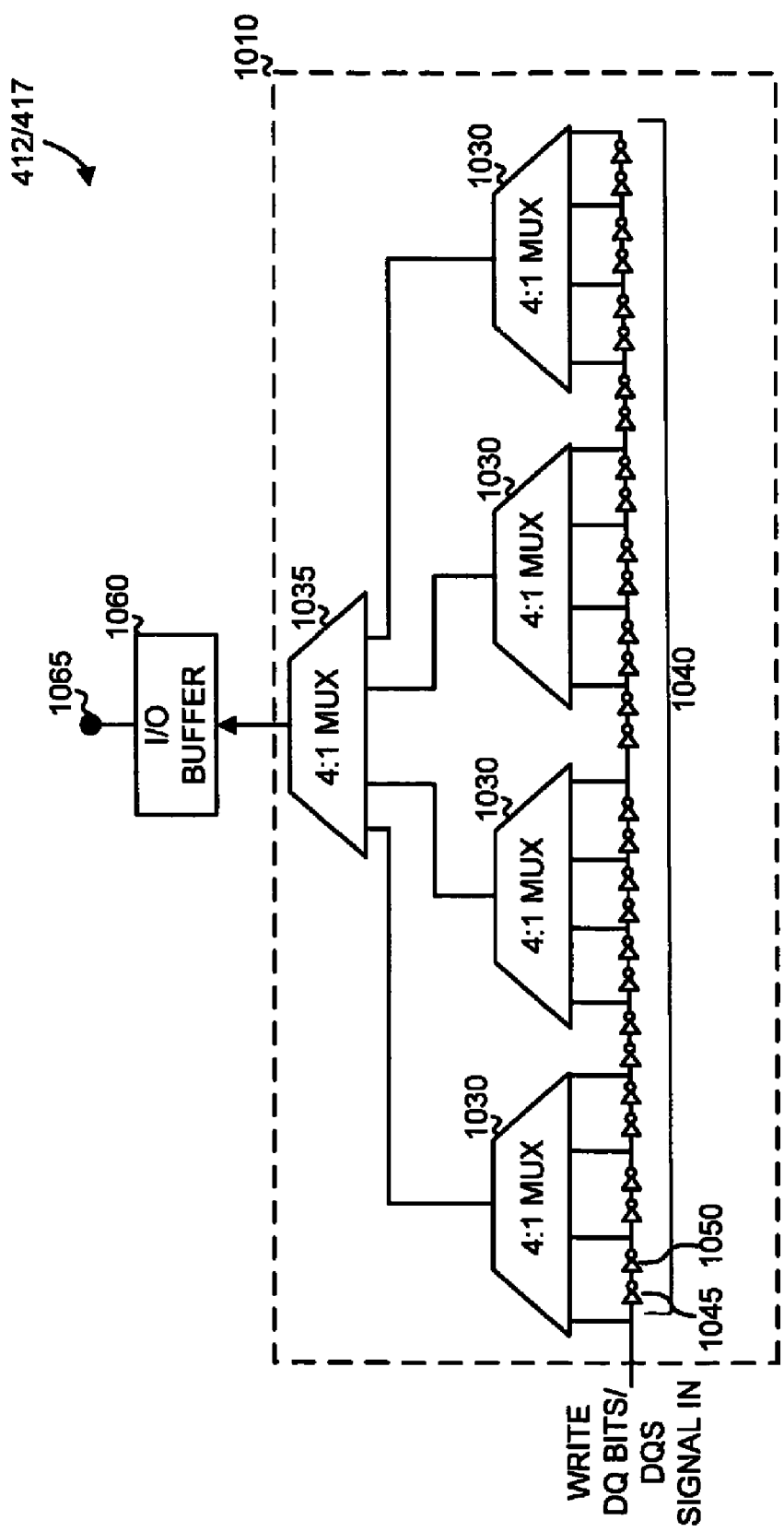
FIG. 10 is a diagram illustrating an exemplary circuit corresponding to a write delay sub-circuit.

FIG. 10 is a diagram illustrating an exemplary circuit corresponding to a write delay sub-circuit, such as write delay sub-circuit 412-1. Each of write delay sub-circuits 412 may be implemented as a circuit similar to the circuit shown in FIG. 10. Additionally, DQS write delay sub-circuit 417 may be implemented as a circuit similar to the circuit shown in FIG. 10.

Incoming data that is to be written to memory device 115-1 may pass through a selectable delay section 1010. Selectable delay section 1010 may be implemented in a manner similar to selectable delay section 720 (FIG. 7). As particularly shown, a 16:1 multiplexer may be implemented using four 4:1 multiplexers 1030 that are connected, at the output, to another 4:1 multiplexer 1035. The 16 inputs of the multiplexers 1030 may each correspond to a tap in a delay section 1040. Each successive tap may be separated from one another by a delay element, shown in FIG. 10 as two serially connected inverters 1045 and 1050 for each delay element. In one implementation, each delay element 1045 and 1050 may be implemented as an inverter that provides approximately 18-40 picoseconds of delay.

The write delay sub-circuit shown in FIG. 10 may additionally include a buffer 1060 connected to the output of multiplexer 1035. Buffer 1060 may buffer the output data to a pad 1065. Pad 1065 may provide the physical connection leading to memory device 115-1 over the DQ or DQS line.

Figure 11:
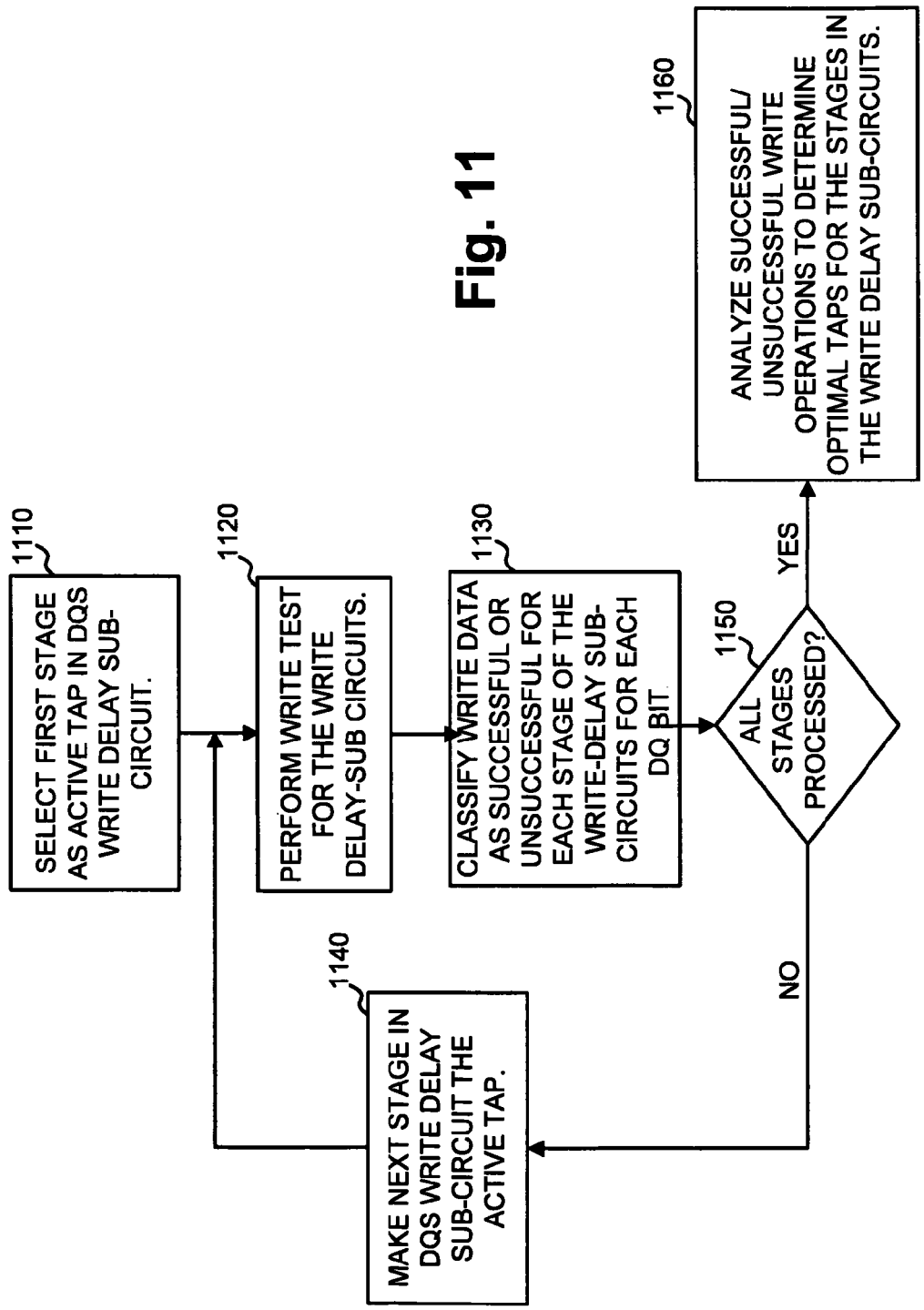
FIG. 11 is a flow chart illustrating exemplary operations for performing write training using the write delay sub-circuit shown in FIG. 10.

FIG. 11 is a flow chart illustrating exemplary operations for performing write training using the circuit shown in FIG. 10.

As shown in FIG. 11, control logic 430 of memory controller 120 may select the first stage, as the active tap in DQS write delay sub-circuit 417 (block 1110). A write test may next be performed for all the write delay sub-circuits 412 (block 1120). In other words, writes may be performed based on the active tap in DQS write delay sub-circuit 417 and each successive tap in the write delay sub-circuits 412. For each DQ bit, the written data may be read back and classified as a successful write when the read back data matches the written data (block 1130). Blocks 1120 and 1130 may be repeated for each tap in DQS write delay sub-circuit 417. In other words, control logic 430 may set the next stage in DQS write delay sub-circuit 417 as the active tap (block 1140) until all the stages have been processed (block 1150—YES). At this point, control logic 430 may analyze the successful/unsuccessful write operations to determine optimal taps for the stages in DQS write delay sub-circuit 417 and each of the write delay sub-circuits 412 (block 1160).

In one implementation, the optimal stages may be selected by control logic 430 similar to the selection of the taps selected for the read delay sub-circuits. Thus, matrices similar to those shown in FIG. 9 may be generated based on the write successful/unsuccessful classifications. Control logic 430 may then select the tap to use for DQS write delay sub-circuit 417 as the tap corresponding to matrix 910 that has the largest number of total successes (i.e., 0s) and in which each write delay sub-circuit 412-0 through 412-7 (i.e., each row in a matrix) has a certain minimum number of successes. For each row in the selected matrix, control logic 430 may then select a tap for the corresponding write delay sub-circuit as the tap corresponding to the middle success in the longest series of successive successes.

Returning to FIG. 5, control logic 430 may set the delays for the write delay sub-circuits based on the determined optimal stages as the active write taps (block 550) and memory controller training may cease. Subsequent write operations performed by memory controller 120 may be performed using the set tap stages. In other words, the outgoing DQS strobe may be delayed an amount based on the selected stage in DQS write delay sub-circuit 417 and each outgoing data signal on the DQ lines may propagate through the set number of taps in the corresponding write delay sub-circuit 412 before being selected and output to memory device 115-1.

As described above with respect to FIGS. 10 and 11, timing skew present when writing data to a DDR SDRAM may be reduced by deterministically locating optimum settings for the write strobe line and each of the data bits within a byte lane. A fixed quarter cycle offset on the bi-directional strobe may be implemented on a circuit board at the required target operating frequency. The de-skew circuits can provide enough range to offset static skews and to adjust for additional delay as required on the strobe or data path to support interface operation at higher or lower frequencies from the target frequency.

Figure 12:
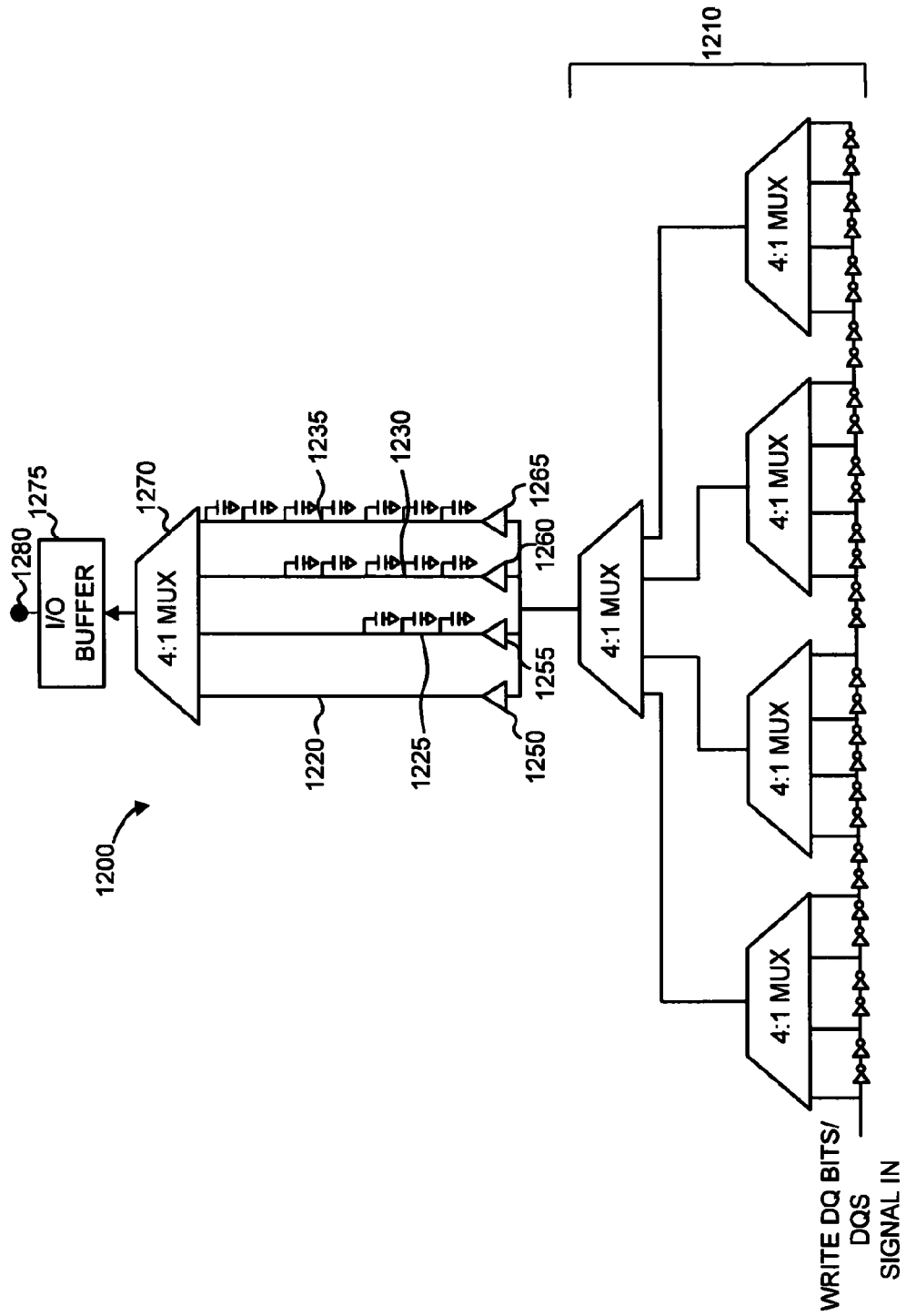
FIG. 12 is a diagram illustrating an exemplary circuit corresponding to a write delay sub-circuit.

FIG. 12 is a diagram illustrating an exemplary circuit 1200 corresponding to a write delay sub-circuit, such as write delay sub-circuit 412-1, according to another exemplary embodiment. Each of write delay sub-circuits 412 may be implemented as a circuit similar to the circuit shown in FIG. 12. Additionally, DQS write delay sub-circuit 417 may be implemented as a circuit similar to the circuit shown in FIG. 12.

Write delay sub-circuit 1200 may include a section 1210 that includes a 16:1 multiplexer and 16 delay stages similar to that for the write delay sub-circuit discussed above with respect to FIG. 10. Additionally, as shown in FIG. 12, the output of section 1210 may be passed through four fine delay lines 1220, 1225, 1230, and 1235. In some implementations, more or less than four fine delay lines may be used. Each of fine delay lines 1220, 1225, 1230, and 1235 may be connected to zero or more small capacitive loads in order to introduce a relatively small delay into the signal. As shown in FIG. 12, fine delay line 1220 may not include any capacitive loads, fine delay line 1225 may include three capacitive loads, fine delay line 1230 may include five capacitive loads, and fine delay line 1235 may include seven capacitive loads.

As additionally shown in FIG. 12, inverting buffers 1250, 1255, 1260, and 1265 may be placed at the beginning of each fine delay line 1220, 1225, 1230, and 1235. A 4:1 multiplexer 1270 may terminate fine delay lines 1220-1235 which may further provide its output to an I/O buffer 1275, which may buffer its received data for an I/O pad 1280.

Training with write-delay sub-circuit 1200 may be performed similarly to the training of the write delay sub-circuit shown in FIG. 10, except that instead of there being 16 possible tap positions, for each tap position, there are four additional possible signal paths (e.g., fine delay lines 1220-1235, yielding a total of 64 effective possible tap positions.

Figure 13:
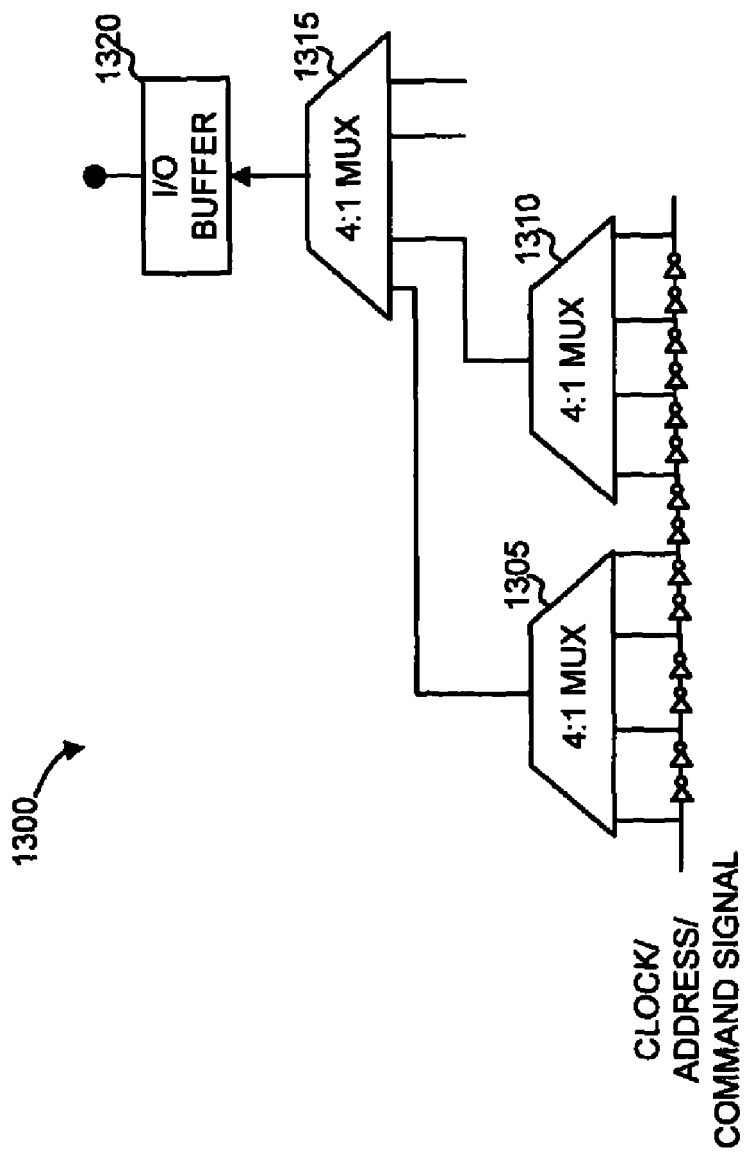
FIG. 13 is a diagram illustrating an example of a circuit in the path of address/command and clock paths.

In addition to the read delay sub-circuits 411, write delay sub-circuits 412, DQS read delay sub-circuit 416, and write delay sub-circuit 417, memory controller 120 may include additional circuitry in the path of the address/command and clock paths. FIG. 13 is a diagram illustrating an example of a circuit 1300 that may be included in the path of the address/command and clock paths. Circuit 1300 may duplicate the fixed delays provided by the write delay sub-circuits, and may achieve this by implementing a circuit configuration identical to a portion of the write delay sub-circuits.

More particularly, as shown in FIG. 13, circuit 1300 may include two first level 4:1 multiplexers 1305 and 1310, a second level 4:1 multiplexer 1315, and an I/O buffer 1320. Multiplexers 1305 and 1315 may be hardwired to select their first input. Multiplexer 1310 may essentially not be used. In this manner, the input signal may experience the delay equivalent to two 4:1 multiplexers, similar to the delay experienced by the undelayed version of the signals that traverse the circuit shown in FIG. 10.

CONCLUSION

As described above, a memory controller may implement variable delay elements, on a per-bit basis, in both the read and write paths in a DDR SDRAM. The variable delay elements may be adjusted according to training that deterministically locates optimum settings for the strobe and data bit lines.

While series of acts have been described with regard to FIGS. 5, 8, and 11, the order of the acts may be varied in other implementations consistent with the invention. Moreover, non-dependent acts may be implemented in parallel.

It will also be apparent that aspects described herein may be implemented in many different forms of software, firmware, and hardware in the implementations illustrated in the figures. The actual software code or specialized control hardware used to implement aspects described herein is not intended to limit the scope of the invention. Thus, the operation and behavior of the aspects were described without reference to the specific software code—it being understood that software and control hardware can be designed to implement the aspects based on the description herein.

Further, certain aspects described herein may be implemented as "logic" or as a "component" that performs one or more functions. This logic or component may include hardware, such as an application specific integrated circuit or a field programmable gate array, or a combination of hardware and software.

Even though particular combinations of features are recited in the claims and/or disclosed in the specification, these combinations are not intended to limit the disclosure of the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the description of the invention should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A device comprising:
a random access memory device configured to store data; and
a memory controller connected to the memory device via a plurality of data lines and a strobe line, the memory controller including:
a plurality of adjustable delay circuits, each of the plurality of adjustable delay circuits being associated with one of the data lines and the strobe line, and inserting an adjustable amount of delay into a signal destined to or received from the one of the data lines or the strobe line, each of the plurality of adjustable delay circuits including:
a write delay sub-circuit configured to delay a data signal being transmitted to the memory device, and
a read delay sub-circuit configured to delay the data signal after the data signal is received from the memory device, the read delay sub-circuit further including:
a plurality of taps located between serially connected delay elements, and
a pair of buffers connected to each of the plurality of taps, and
control logic to determine the delay amount for each of the plurality of adjustable delay circuits, the delay amount being determined to reduce timing skew between the data lines and the strobe line.

2. The device of claim 1, further comprising:
one or more devices connected to interact with the random access memory device through an interface provided by the memory controller.

3. The device of claim 1, where the random access memory device includes a double data rate 3 synchronous dynamic random access memory (DDR3 SDRAM).

4. The device of claim 1, where the write delay sub-circuit further includes:
a plurality of serially connected delay elements; and
selection logic for selecting a signal from at least one of the plurality of serially connected delay elements.

5. The device of claim 4, where the selection logic includes a plurality of multiplexers connected in a cascaded configuration.

6. A device comprising:
- a random access memory device configured to store data and
- a memory controller connected to the memory device via a plurality of data lines and a strobe line, the memory controller including:
  - a plurality of adjustable delay circuits, each of the plurality of adjustable delay circuits being associated with one of the data lines and the strobe line, and inserting an adjustable amount of delay into a signal destined to or received from the one of the data lines or the strobe line, each of the plurality of adjustable delay circuits including:
    - a write delay sub-circuit configured to delay a data signal being transmitted to the memory device, where the write delay sub-circuit further includes:
      - a plurality of serially connected delay elements,
      - selection logic for selecting a signal from at least one of the plurality of serially connected delay elements,
      - a plurality of fine grain delay lines connected to an output of the selection logic, at least some of the plurality of fine grain delay lines including capacitive delay elements, and
      - a multiplexer connected to the output of the plurality of fine grain delay lines, and
    - a read delay sub-circuit configured to delay the data signal after the data signal is received from the memory device, and
  - control logic to determine the delay amount for each of the plurality of adjustable delay circuits, the delay amount being determined to reduce timing skew between the data lines and the strobe line.

7. The device of claim 6, further comprising:
- one or more devices connected to interact with the random access memory device through an interface provided by the memory controller.

8. The device of claim 6, where the random access memory device includes a double data rate 3 synchronous dynamic random access memory (DDR3 SDRAM).

9. The device of claim 6, where the selection logic includes a plurality of multiplexers connected in a cascaded configuration.

10. The device of claim 6, where the write delay sub-circuit further includes:
- a plurality of fine grain delay lines connected to an output of the selection logic, at least some of the plurality of fine grain delay lines including capacitive delay elements; and
- a multiplexer connected to the output of the plurality of fine grain delay lines.

11. The device of claim 6, where the control logic determines the delay amount during initialization of the device.

12. The device of claim 1, where each buffer, of the pair of buffers, includes each include:
- a first flip-flop to sample data on a rising edge of a strobe signal; and
- a second flip-flop to sample data on a falling edge of the strobe signal.

13. The device of claim 1, where the control logic determines the delay amount during initialization of the device.

14. A method for initializing a memory controller, the method comprising:
- determining first delay periods to apply to data lines connected to a memory device when reading data from the memory device, where the first delay periods are determined separately for each of the data lines, where the first delay periods are associated with a plurality of write delay circuits in the memory device, each of the plurality of write delay circuits including a first plurality of serially connected delay elements, and where each of the first delay periods is associated with a selection of a tap associated with one of the first plurality of serially connected delay elements; and
- determining second delay periods to apply to the data lines connected to the memory device when writing data to the memory device, where the second delay periods are determined separately for each of the data lines, where the second delay periods are associated with a plurality of read delay circuits in the memory device, each of the plurality of read delay circuits including a second plurality of serially connected delay elements, and where each of the second periods is associated with a selection of a tap associated with one of the second plurality of serially connected delay elements; and
- configuring the memory controller to apply the determined first or second delay periods when reading from or writing to the memory device.

15. The method of claim 14, further comprising:
- writing data to the memory device at less than full frequency before determining the first delay periods.

16. The method of claim 14, where determining the first delay periods further includes:
- determining, for each of the data lines, whether a first plurality of delays, applied to a signal from the memory device, result in successful read operations; and
- determining whether a second plurality of delays, applied to a strobe signal from the memory device, result in successful read operations.

17. The method of claim 14, where determining the second delay periods further includes:
- determining, for each of the data lines, whether a first plurality of delays, applied to a signal that is to be sent to the memory device, result in successful write operations; and
- determining whether a second plurality of delays, applied to a strobe signal that is to be sent to the memory device, result in successful write operations.

18. A memory controller comprising:
- first signal pads for connecting to a plurality of data lines that connect to a memory device;
- a second signal pad for connecting to a strobe line that connects to the memory device;
- a write delay circuit connected to each of the first signal pads, each of the write delay circuits including a first plurality of serially connected delay elements, where a tap associated with one of the delay elements is selected to provide a corresponding delay to an output of each of the write delay circuits; and
- a read delay circuit connected to each of the first signal pads, each of the read delay circuits including a second plurality of serially connected delay elements, where a tap associated with one of the second plurality of delay elements is selected to provide a corresponding delay to an input of each of the read delay circuits.

19. The memory controller of claim 18, where the memory device includes a double data rate 3 synchronous dynamic random access memory (DDR3 SDRAM).

20. The memory controller of claim 18, further comprising:
- a strobe write delay circuit connected to the second signal pad, the strobe write delay circuit including a third plurality of serially connected delay elements, where a tap associated with one of the third plurality of delay elements is selected to provide a corresponding delay to a strobe signal that is output to the strobe line.

21. The memory controller of claim 18, further comprising:
- a strobe read delay circuit connected to the second signal pad, the strobe read delay circuit including a third plurality of serially connected delay elements, where a tap associated with one of the third plurality of delay elements is selected to provide a corresponding delay to a strobe signal that is input from the strobe line.

22. The memory controller of claim 18, where the write delay circuit further includes:
- selection logic for selecting a tap signal to provide a corresponding delay to an output of each of the write delay circuits.

23. The memory controller of claim 22, where the selection logic includes a plurality of multiplexers connected in a cascaded configuration.

24. The memory controller of claim 22, where the write delay circuit further includes:
- a plurality of fine grain delay lines connected to an output of the selection logic, each of the plurality of fine grain delay lines including capacitive delay elements; and
- a multiplexer connected to outputs of the plurality of fine grain delay lines.

25. The memory controller of claim 18, where the read delay circuit further includes:
- a plurality of first flip-flops to sample data on one of the data lines on a rising edge of a strobe signal from the strobe line; and
- a plurality of second flip-flop to sample data on one of the data lines on a falling edge of the strobe signal.

26. The memory device of claim 18, further comprising:
- control logic to set the taps on the write delay circuits and the read delay circuits to reduce timing skew between the plurality of data lines and the strobe line.

* * * * *

UNITED STATES PATENT AND TRADEMARK OFFICE
CERTIFICATE OF CORRECTION

PATENT NO. : 8,081,527 B1  
APPLICATION NO. : 12/437740  
DATED : December 20, 2011  
INVENTOR(S) : Srinivas Venkataraman et al.

Page 1 of 1

It is certified that error appears in the above-identified patent and that said Letters Patent is hereby corrected as shown below:

Column 11, claim 6, line 5, following the word "data" insert --;--.

Column 11, claim 12, line 61, following the word "includes" insert --:--; and delete "each include:".

Signed and Sealed this

Thirty-first Day of January, 2012

David J. Kappos
*Director of the United States Patent and Trademark Office*